M. NEAL.
Churn.
No. 44,836. Patented Oct. 25, 1864.
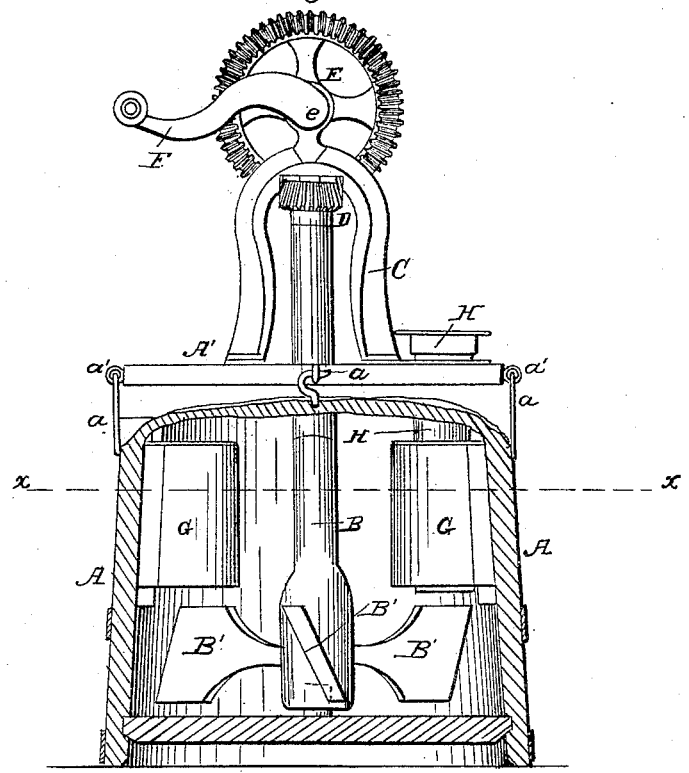
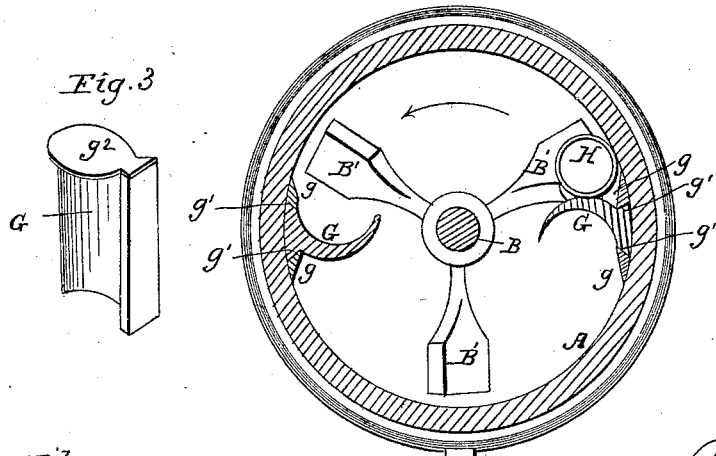
Witnesses:
Charles D. Smith
Edward H. Knight
Inventor:
Moses Neal
By Munn & Co
Attorneys

UNITED STATES PATENT OFFICE.

MOSES NEAL, OF KALAMAZOO, MICHIGAN, ASSIGNOR TO NEAL & FINCH, OF SAME PLACE.

IMPROVEMENT IN CHURNS.

Specification forming part of Letters Patent No. 44,836, dated October 25, 1864.

*To all whom it may concern:*

Be it known that I, MOSES NEAL, of the city and county of Kalamazoo, in the State of Michigan, have invented a new and useful Improvement in Churns; and I do hereby declare the following to be a full and exact description of the same, reference being had to the accompanying drawings, making part of this specification, in which—

Figure 1 is a vertical section of a churn exhibiting my invention. Fig. 2 is a horizontal section of the same in the line $x\,x$. Fig. 3 is a detached perspective view illustrating more clearly the construction of the breaks hereinafter described.

Similar letters of reference indicate corresponding parts in the several figures.

This invention consists, first, in the employment of certain devices, hereinafter described, which render the formation of the butter more effectual and expeditious; second, in a novel medium for varying the temperature of the air within the churn, so as to regulate that of the milk in order to better adapt it to undergo the churning process.

In order that others skilled in the art to which my invention appertains may be enabled to fully understand and use the same, I will proceed to describe its construction and operation.

In the accompanying drawings, A represents the receptacle for the cream, which may be cylindrical, or nearly so, and constructed in any suitable manner. The lid A' is held down by hooks $a$, which take into staples $a'$, and a portion of said lid may be detached in order to admit of the introduction of the cream or the removal of the butter.

B is a shaft placed vertically and centrally within the receptacle A, the said shaft being journaled at its respective ends in the bottom of the receptacle and in a box formed in a metallic standard, C, secured upon the lid A' by screws or otherwise. Both the bearings of the shaft B will admit of its free rotation, and near its lower end the said shaft is provided with wings or dashers B', which revolve with the shaft B in the direction indicated by the arrow. The drawings represent three of these wings; but the number may be varied as desired, and they may be secured to the shaft, so as to rotate therewith and act upon the milk with the requisite force without sustaining injury by having their ends inserted into corresponding apertures in the shaft or by being attached thereto by any adequate appliance. Near the point at which the shaft B is journaled in the standard C at its upper end, and rigidly secured upon said shaft, is a bevel cog-wheel, D, to which a rotary motion is transmitted from a miter gear-wheel, E, the latter being keyed upon the end of a short shaft, $e$, which has its bearing and turns within a boxed formed or cast upon the top of the standard C. Through the medium of these devices the shaft B, with the wings B', may be rotatated at a high velocity by means of a hand-crank, E.

G G represent breaks formed with flanges G' G', whereby they are adapted to be secured upon the inner sides of the churn A by cleats $g\,g$. The breaks G are located at a suitable point above the wings B', so that the latter may revolve directly beneath them and the cleats $g\,g$ admit of the vertical adjustment of the breaks G, in order that when a larger or smaller quantity of cream is to undergo the churning process the breaks may be elevated or lowered to such positions as will best adapt them to perform their functions. The cleats also permit the breaks to be removed for cleaning purposes. These breaks G in their transverse section have the form of an arc, the cream being forced against their concave sides by the action of the wings B'. The vertical or whirling motion of the cream imparted by the wings B' causes the same to rise spirally, and in doing this the circular motion of the current is intercepted by the breaks G, and when the current thus comes in contact with the breaks it circulates in conformity with the concave face of the same, and at the same time slightly ascends in consequence of the spiral motion above alluded to. This current is thrown continually in a reverse or backward and downward direction in curved form and the tendency of this downward current is contrary to that of the main body circulating within the churn; hence when that portion of the cream which is intercepted by and is reversed within the concavity of the break is returned in the manner described, a collision or mutual impact of the two bodies takes place, and this collision produces the rapid condensation of the cream.

As illustrated in Fig. 2, the acting-faces of the wings B' are presented in an upward direction, which increases the uprising tendency of the cream when the churn is in operation. Two of the breaks will produce the above effect in a most satisfactory manner, but I propose to use one, two, or more, as experience may prove to be desirable.

It may be remarked that the form of the wings or dashers B' does not constitute an essentiality of my invention inasmuch as any common dasher revolving horizontally will produce the desired effect.

The breaks may be provided with caps $g^2 g^2$.

It is well known that cream is in its best churning condition when at a certain temperature. This temperature is varied to a great extent by the natural variations of heat, and hence hot or cold water has hitherto been added to or mixed with the cream to bring the same to the desired temperature. This is objectionable inasmuch as the mingling of the water with the cream interferes with the quality of the butter produced.

I employ an expedient whereby the temperature of the cream is reduced or heightened through the medium of the atmospheric air within the churn, and this expedient consists in a hollow cylinder, H, which is inserted through the lid A, so as to project the proper distance within the churn. This cylinder may be filled with hot or cold water, according as the temperture of the cream or of the surrounding air is too low or too high. In this manner the temperature of the cream may be effectually varied without mingling any extraneous matter with the cream.

Having thus described my invention, I wish it understood that I do not claim the shaft with inclined dashers separately or in combination with straight breakers; but

What I claim as new, and desire to secure by Letters Patent, is—

The combination of the dashers with the cup-shaped detachable breakers, constructed, arranged, and operating substantially as described and represented.

MOSES NEAL.

Witnesses:
ALEX. A. C. KLAUCKE,
CHARLES D. SMITH.